United States Patent [19]
Demo et al.

[11] Patent Number: 5,511,721
[45] Date of Patent: Apr. 30, 1996

[54] BRAZE BLOCKING INSERT FOR LIQUID PHASE BRAZING OPERATIONS

[75] Inventors: Wayne A. Demo, Fairfield, Ohio; John R. Planchak, Ksherten, Netherlands

[73] Assignee: General Electric Company, Cincinnati, Ohio

[21] Appl. No.: 334,981

[22] Filed: Nov. 7, 1994

[51] Int. Cl.⁶ .................... B23K 1/20; B23P 15/04
[52] U.S. Cl. .................... 228/216; 228/50; 228/119; 29/402.18; 29/889.2
[58] Field of Search .................... 228/118, 119, 228/215, 216, 50, 59; 29/402.18, 889.2; 427/282

[56] References Cited

U.S. PATENT DOCUMENTS

| | | | |
|---|---|---|---|
| 2,473,887 | 6/1949 | Jennings et al. | 113/112 |
| 3,110,102 | 11/1963 | Pfefferkorn | 29/490 |
| 3,623,921 | 11/1971 | Behringer et al. | 148/22 |
| 3,846,903 | 11/1974 | Rupert et al. | 29/487 |
| 3,858,303 | 1/1975 | Horbury et al. | 29/490 |
| 3,906,617 | 9/1975 | Behringer et al. | 228/118 |
| 4,023,251 | 5/1977 | Darrow | 29/156.8 H |
| 4,040,159 | 8/1977 | Darrow et al. | 29/156.8 H |
| 4,364,783 | 12/1982 | Theodore et al. | 156/69 |
| 4,634,039 | 1/1987 | Banerjee | 228/118 |
| 4,726,104 | 2/1988 | Foster et al. | 228/119 |
| 4,876,777 | 10/1989 | Chow | 156/86 |
| 4,940,566 | 7/1990 | Wood et al. | 228/263.13 |
| 5,047,449 | 9/1991 | Pastureau | 428/447 |
| 5,122,215 | 6/1992 | Shibata et al. | 156/250 |
| 5,317,067 | 5/1994 | Yagi et al. | 525/438 |

*Primary Examiner*—Samuel M. Heinrich
*Attorney, Agent, or Firm*—Andrew C. Hess; David L. Narciso

[57] ABSTRACT

A preform insert for use in preventing the flow of a braze or solder material into a void in an article during a brazing or soldering operation. The insert is particularly suited to brazing techniques for repairing stator vanes of a gas turbine, though equally effective for use in the manufacture or repair of other articles, as well as soldering operations. The preform insert is composed of a refractory metal oxide powder dispersed in a polymeric solid such that the preform insert is solid yet relatively flexible. As such, the preform insert can be formed to be appropriately shaped and sized to fill a void in an article, such that the void will remain open after the brazing or soldering operation.

9 Claims, 1 Drawing Sheet

BRAZE BLOCKING INSERT FOR LIQUID PHASE BRAZING OPERATIONS

The present invention relates to brazing and soldering processes in which it is desirable to control or limit the flow of molten braze or solder material. More particularly, this invention relates to a moldable solid insert which is adapted to be placed in voids, such as holes and grooves, in an article to be brazed or soldered, such that molten braze or solder is prevented from filling the void during the brazing operation.

BACKGROUND OF THE INVENTION

Gas turbine engines having multi-stage turbine sections typically have stator vanes placed at the entrance and exit of the turbine section, as well as between each turbine stage, for purposes of properly directing the air flow to each successive turbine stage. In service, stator vanes are exposed to a hostile environment which can erode the vanes and lead to the formation of undesirable cracks and voids in the surfaces of the vanes. Stator vanes may be repaired using a brazing operation in which a braze alloy is melted and flowed over the vane's surface in order to rebuild the damaged regions of the vane. As with brazing operations performed on many other types of components and machinery, the surface over which the molten braze alloy is permitted to flow must often be limited. For example, voids such as cooling, mounting and locating holes, seal grooves, and datum locators on the surface of a vane must not be filled by the molten braze alloy in order for these features to remain useful.

Presently, molten braze alloy is typically excluded from useful features present in the surface of a stator vane by the use of liquid braze blocking compositions. These compositions are typically composed of fine oxide particles, such as aluminum oxide ($Al_2O_3$) or yttrium oxide ($Y_2O_3$), suspended in a liquid carrier medium. Examples of this approach are taught by U.S. Pat. Nos. 2,473,887 to Jennings et al., 3,110,102 to Pfefferkorn, 3,623,921 and 3,906,617 to Behringer et al., 3,858,303 to Horbury et al., and 4,023,251 and 4,040,159 to Darrow. The liquid carrier is generally formulated such that it can be either evaporated prior to brazing or burned off during the brazing process, so as to leave a cohesive film of oxide powder on the surface of the vane. If the oxide powder film is sufficiently thick, the braze alloy will not flow onto or adhere to the film due to surface tension effects.

A disadvantage with this type of braze blocking composition arises when a crack or void to be repaired intersects one of the required features in the vane, such as a cooling hole. As such, in an attempt to fill the hole with the braze blocking composition, the blocking composition will also tend to flow into and fill at least a portion of the void to be repaired, due to the composition being in the form of a liquid or slurry. As a result, the braze alloy is prevented from adequately filling and/or adhering to the surface of the undesirable void, or at best will result in a porous braze fill due to an interaction between the braze alloy and the braze blocking composition. Consequently, the time required for repairing and refurbishing stator vanes can be significant due to the requirement for post-brazing inspections, repairs and scrappage, all of which add considerable processing and material costs.

While the prior art has suggested the use of braze blocking pastes, such as those taught by U.S. Pat. Nos. 3,846,903 to Rupert et al. and 4,634,039 to Banerjee, the accuracy with which these pastes may be applied is often inadequate for repairing and refurbishing stator vanes. Even if precisely applied, known braze blocking compositions tend to shrink as the liquid carrier is evaporated or volatilized, such that molten braze alloy is permitted to flow into the voids, holes and grooves which are intended to remain open.

Accordingly, it would be advantageous to provide an improved braze blocking composition which overcomes the shortcomings of the prior art. Specifically, it would be desirable to provide a braze blocking composition which can be precisely placed to completely and reliably fill a void, hole or groove on the surface of an article, such as the cooling holes and seal grooves of a stator vane for a gas turbine engine, such that molten braze alloy will not flow into the void, hole or groove during a brazing operation. In addition, it would be advantageous if such a braze blocking composition could be readily removed after brazing.

SUMMARY OF THE INVENTION

It is an object of this invention to provide an improved blocking composition for use in the manufacture and repair of brazed or soldered articles, such as the repair of stator vanes for a gas turbine engine.

It is a further object of this invention that such a blocking composition be in the form of a solid insert which can be accurately and specifically shaped to fit a particular void in the surface of the article, yet sufficiently flexible to facilitate manufacturing and use of the insert.

It is another object of this invention that such an insert be composed of materials which are compatible with brazing and soldering processes and operations.

In accordance with a preferred embodiment of this invention, these and other objects and advantages are accomplished as follows.

According to the present invention, there is provided a preform insert for use in preventing the flow of a joining material into a void in an article during a joining operation. The insert is particularly suited to brazing techniques for repairing stator vanes of a gas turbine engine, though equally effective for use in the manufacture or repair of other articles, as well as soldering operations. The preform insert is composed of a refractory metal oxide powder dispersed in a polymeric solid such that the preform insert is solid yet relatively flexible. As such, the preform insert can be formed to be appropriately shaped and sized to fill a void in an article, such that molten braze or solder alloy is prevented from filling the void during the brazing or soldering operation.

In view of the above, it can be seen that the insert of this invention makes possible an improved brazing or soldering operation for the repair of an article, such as a stator vane. The method generally includes the steps of appropriately forming the preform insert such that the insert has a predetermined shape and size for filling a particular void in the article to be brazed or soldered. The preform insert is then positioned in the void such that the insert completely fills the void, and is reliably retained in the void due to friction generated by an interference fit. Because the insert is formed as a flexible solid, the insert will not tend to shrink before or during the brazing or soldering operation, such that the ability for the insert to prevent the flow of molten braze or solder alloy into the void is reliably preserved.

A suitable braze or solder material can then be applied to the surface of the article without concern for the material filling the void. The article can then be heated in a conventional manner to melt and flow the braze or solder material.

During this operation, the polymeric solid component of the insert is cleanly and completely burned off, so as to leave the refractory metal oxide powder in the void. As such, the powder is able to prevent the flow of molten braze or solder material into the void during this operation. After cooling the article, the powder can be removed from the void by such techniques as vibration, compressed air or washing.

In view of the above, an advantage of the present invention is that the insert can be precisely formed so as to completely and reliably fill a void, such as a hole or groove, in an article to be brazed or soldered. As a result, a molten braze or solder alloy will not flow into the void during the joining operation, such that the intended function of the void is retained.

In addition, the insert is formulated so as to be readily removed after the joining operation. In particular, the polymeric solid completely and cleanly burns off at the elevated temperatures required for brazing and soldering operations, leaving the oxide powder in place within the void. Afterwards, the oxide powder can also be completely eliminated using conventional processing techniques.

Another advantage of this invention is the ability to increase the throughput of many joining operations. In particular, the repair of stator vanes used in turbomachinery is greatly facilitated by the ability of the insert to be precisely placed where required to prevent the unwanted flow of braze or solder alloy into desirable surface features in a vane. As a result, the incidence of additional repairs and scrappage is reduced, such that processing and material costs are also reduced.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
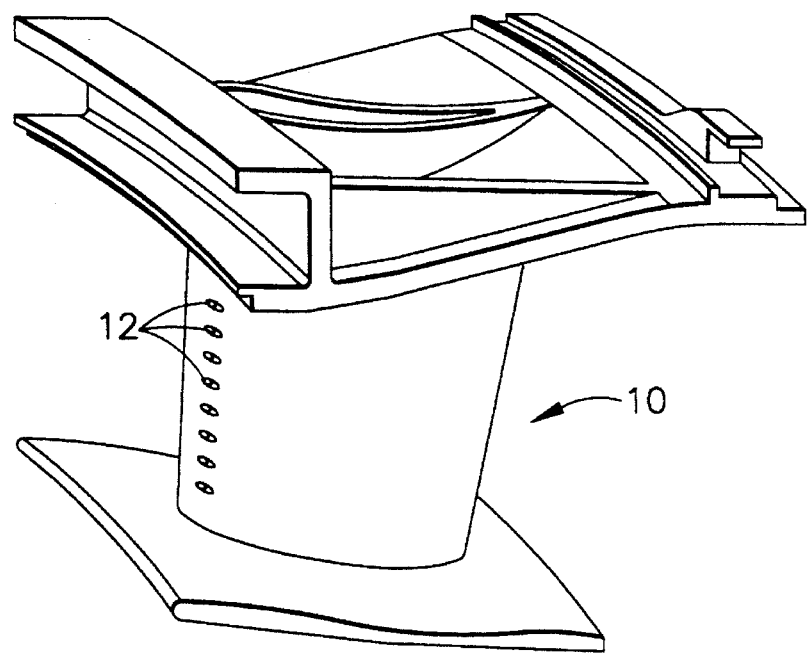
FIG. 1 is a perspective view of a stator vane of a type known in the art.

The present invention provides a braze blocking material which enables an improved method for the repair of stator vanes used in gas turbine engines, such as the stator vane 10 represented in FIG. 1. Preferably, the vane 10 is formed from a suitable high temperature material, such as an appropriate nickel-based superalloy of a type known in the art, and may be cast as a single crystal or directionally solidified casting to promote the high temperature properties of the castings. As shown, the stator vane 10 includes a cooling hole 12 which serves to reduce the operating temperature of the vane 10, and thereby increases the service life of the vane 10, as well as promote the ability of the vane 10 to structurally withstand the severe operating conditions within the turbine section of a gas turbine engine.

In service, the stator vane 10 is exposed to a hostile environment which gradually erodes the vane 10, and may occasionally crack or form undesirable voids in the surface of the vane 10. Repair of the vane 10 is achieved by brazing a suitable alloy to the surface of the vane 10 so as to fill the cracks and voids. However, during the repair of the vane 10, it is imperative that the cooling hole 14 remain open. As a result, molten braze alloy must be prevented from filling the hole 14 during the brazing operation.

Figure 2:
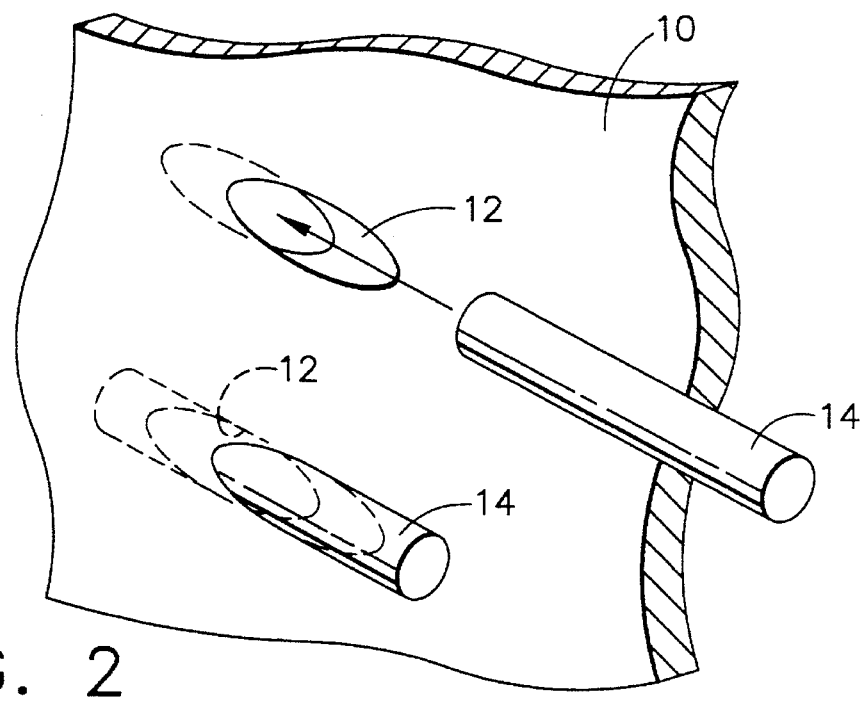
FIG. 2 is a perspective view of a preform insert formed in accordance with a preferred embodiment of this invention.

A preform insert 14 which is formulated in accordance with the present invention is shown in FIG. 2. The composition of the insert 14 includes a refractory metal oxide powder which is able to restrict the flow of a molten braze or solder alloy on the surface of the vane 10. A preferred oxide is aluminum oxide ($Al_2O_3$), or alumina, though it is foreseeable that other suitable refractory metal oxides could be used, such as yttrium oxide ($Y_2O_3$). Importantly, the insert 14 must be carefully sized and shaped to completely fill the cooling hole 12 of the vane 10 shown in FIG. 1. For this purpose, the insert 14 is formed to be sufficiently solid and rigid to allow handling of the insert 14 and placement of the insert 14 in the hole 12, such that the insert 14 can be specifically sized and shaped to precisely fill the hole 12 and will resist flowing onto the surrounding surface of the vane 10. Yet the insert 14 must also be relatively flexible such that the insert 14 can be reliable held in position within the hole 12 prior to the brazing operation, while also allowing somewhat more relaxed dimensional tolerances.

To achieve the above, the insert 14 is formed such that the metal oxide powder is dispersed in a polymeric solid. An ideal polymer for this purpose is a thermoplastic elastomer such as polyurethane, and more preferably polyurethanes available from the Hexcel Corporation under the names Hexcel Uralite 3160 A and B. These materials exhibit a good balance between hardness and flexibility, and volatilize at typical brazing temperatures without sintering into the adjacent metal braze and without leaving a carbon residue. Because the insert 14 is physically a polymeric solid article, it can be readily formed to be appropriately shaped and sized to fill a void in an article, such as the hole 12 in the vane 10 of FIG. 1. As such, the insert 14 is more reliably capable of filling the hole 12, such that molten braze alloy is prevented from filling the void hole 12 during the brazing operation. In addition, the flexibility of the insert 14 enables the use of a slight interference fit in order to retain the insert 14 within the hole 12.

Use of an insert 14 formulated in accordance with this invention enables a novel method for a brazing operation in which the flow of molten braze alloy is controlled or limited. In the context of the stator vane 10 of FIG. 1, the insert 14 of FIG. 2 serves to prevent a molten braze alloy from flowing into the hole 12 in the vane 10. The method generally involves appropriately forming the insert 14 to have a predetermined shape and size which will enable the insert 14 to completely fill the hole 12. As noted above, suitable polymeric materials are Hexcel Uralite 3160 A and B, which can be readily molded or extruded to form an insert 14 having a suitable shape, size and properties for a given application. Preferably, the insert 14 is characterized as an elastomeric solid having a durometer hardness of about 40 to about 60 Shore D in order to assure sufficient flexibility.

The metal oxide particles are preferably mixed into a homogenous liquid solution formed by the two or more monomers employed to form the polyurethane, in that mixing the oxide particles before this point may lead to gelation and a nonhomogeneous mixture. The metal oxide particles preferably have a particle size on the order of about 38 to about 90 micrometers, so as to promote a homogeneous distribution of the particles within the liquid polymer solution and establish a suitable slurry consistency for the solution, though it is foreseeable that smaller or larger particle sizes could be employed. If desirable, the insert 14 can be formed to be slightly oversized for the hole 12, such that a slight interference will be provided to retain the insert 14 in the hole 12 during the handling of the vane 10 prior to the brazing operation.

When appropriately formed, the insert 14 is then positioned in the hole 12 such that the insert 14 completely fills the hole 12. Because the insert 14 is formed as a flexible solid, a drying operation is not required to dry the insert 14 prior to the brazing operation. As such, the insert 14 will not tend to shrink before or during the brazing operation, such that the ability for the insert 14 to completely and reliably fill the hole 12 is not diminished. Accordingly, the insert 14 is more readily able to prevent the flow of molten braze alloy into the hole 12 during the brazing operation.

A suitable braze alloy is then applied to the surface of the vane 10 in a conventional manner, without concern for the alloy inadvertently filling the hole 12. For the repair of the vane 10, preferred braze alloys include nickel and cobalt-base braze alloy systems of the type known in the art. However, those skilled in the art will appreciate that numerous braze alloys may be suitable, particularly for applications other than the stator vane 10. The vane 10 is then heated in a conventional manner to a temperature which is sufficient to melt and flow the braze alloy on the surface of the vane 10.

At conventional brazing temperatures, the polyurethane component of the insert 14 cleanly and completely burns off, such that the metal oxide powder is left in the hole 12 in a relatively cohesive state. As such, the metal oxide powder prevents the flow of the molten braze alloy into the hole 12 during the brazing operation. After cooling the vane 10, the metal oxide powder is readily removed from the hole 12 by conventional processing techniques, such as by vibration, compressed air or washing.

From the above, it can be seen that a significant advantage of this invention is that the insert 14 provides a novel braze blocking composition which can be precisely placed so as to completely and reliably fill a desired void, such as a cooling hole or seal groove, in an article to be brazed. As a result, the insert 14 is reliably able to prevent the flow of a molten braze into the hole or groove during a brazing operation, such that the intended function of the hole or groove is preserved.

In addition, the insert 14 of this invention is formulated so as to be readily removed after the brazing operation. In particular, the polymeric component of the insert 14 completely and cleanly burns off at the elevated temperatures required for the brazing operation, leaving the metal oxide powder in place within the hole or groove. Afterwards, the metal oxide powder can be completely eliminated using conventional processing techniques.

Another significant advantage of this invention is that the insert 14 enables the throughput of many brazing operations to be significantly increased. In particular, the repair of a stator vane 10 for a gas turbine engine is greatly facilitated by the ability of the insert 14 to be precisely placed where required to prevent the unwanted flow of braze alloy into desirable surface features in a vane 10. As a result, the incidence of additional repairs and scrappage after brazing is reduced, such that the overall processing and material costs involved in the repair of stator vanes is also reduced.

In addition, the insert 14 of this invention is compatible with conventional brazing methods, such that substantially conventional processing techniques can be employed to repair the stator vane 10. The insert 14 is also compatible with solder alloys and soldering processes, such that use of the insert 14 is not limited to brazing operations, but is applicable to numerous other joining processes for a wide variety of articles.

Therefore, while our invention has been described in terms of a preferred embodiment, it is apparent that other forms could be adopted by one skilled in the art. For example, the insert 14 could be formed to have a shape significantly different from that shown, other polymers could be used to produce the desired solid, flexible form for the insert 14, other metal oxide powders could be employed, and the insert 14 could be used in a brazing or soldering operation which differs substantially from that described. Therefore, the scope of our invention is to be limited only by the following claims.

The embodiments of the invention in which an exclusive property or privilege is claimed are defined as follows:

1. A method for preventing the flow of a joining material into a void in an article during a joining operation, the method comprising the steps of:

forming a preform insert comprising a refractory metal oxide powder dispersed in a polymeric solid such that the preform insert is a flexible solid having a shape and size sufficient to fill the void in the article;

inserting the preform insert in the void in the article such that the preform insert fills the void in the article;

applying the joining material to a surface of the article;

heating the article so as to melt and flow the joining material and burn off the polymeric solid so as to leave the refractory oxide in the void, such that the refractory oxide prevents the flow of the joining material into the void during the heating step;

cooling the article; and removing the refractory oxide.

2. A method as recited in claim 1 wherein the refractory oxide is alumina.

3. A method as recited in claim 1 wherein the refractory metal oxide powder has a particle size on the order of about 38 to about 90 micrometers.

4. A method as recited in claim 1 wherein the forming step comprises a molding operation.

5. A method as recited in claim 1 wherein the heating step comprises a brazing operation.

6. A method as recited in claim 1 wherein the polymeric solid is a thermoplastic polyurethane.

7. A method for preventing the flow of a braze material into a void in an turbomachinery member during a brazing operation, the method comprising the steps of:

forming a preform insert consisting essentially of an alumina powder dispersed in a thermoplastic polyurethane such that the preform insert is a flexible solid having a shape and size sufficient to fill the void in the turbomachinery member;

inserting the preform insert in the void in the turbomachinery member such that the preform insert fills the void in the turbomachinery member;

applying the braze material to a surface of the turbomachinery member;

heating the turbomachinery member so as to melt and flow the braze material and burn off the thermoplastic polyurethane so as to leave the alumina powder in the void, such that the alumina powder prevents the flow of the braze material into the void during the heating step;

cooling the turbomachinery member; and removing the alumina powder from the void.

8. A method as recited in claim 7 wherein the alumina powder has a particle size on the order of about 38 to about 90 micrometers.

9. A method as recited in claim 7 wherein the forming step comprises a molding operation.

\* \* \* \* \*